(No Model.) 2 Sheets—Sheet 1.
W. G. PRICE.
CAR COUPLING.
No. 583,548. Patented June 1, 1897.
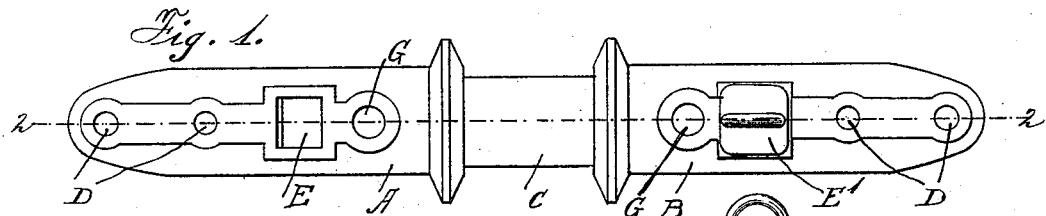
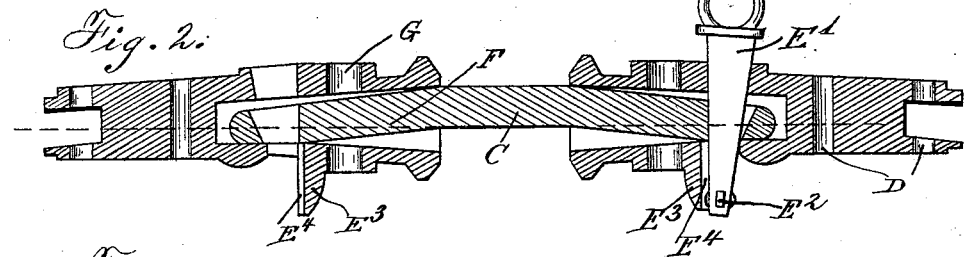
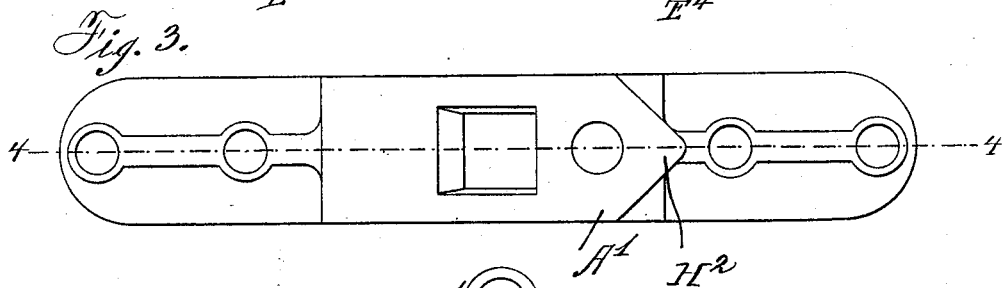
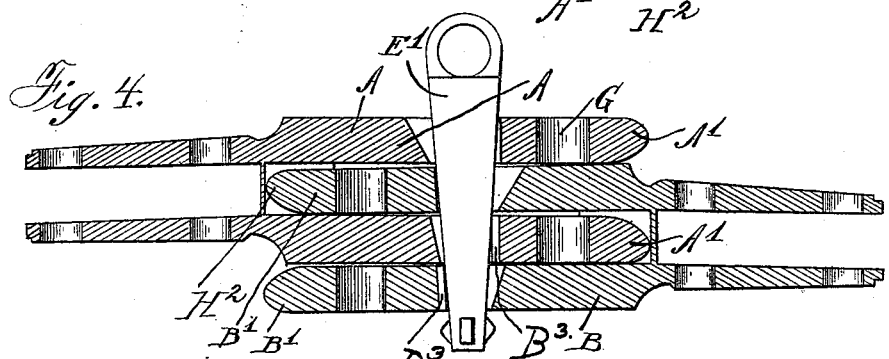
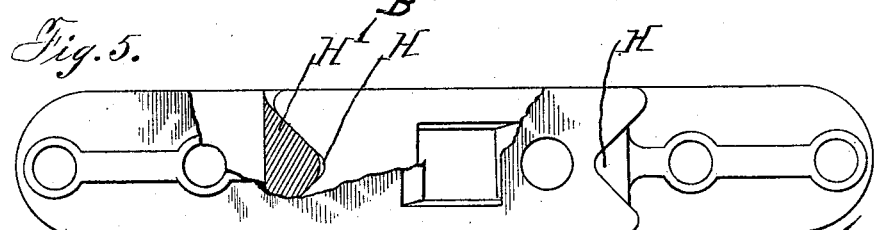
Witnesses:
Inventor:
William G. Price
by Francis W. Parker
Atty.

(No Model.) 2 Sheets—Sheet 2.
W. G. PRICE.
CAR COUPLING.
No. 583,548. Patented June 1, 1897.
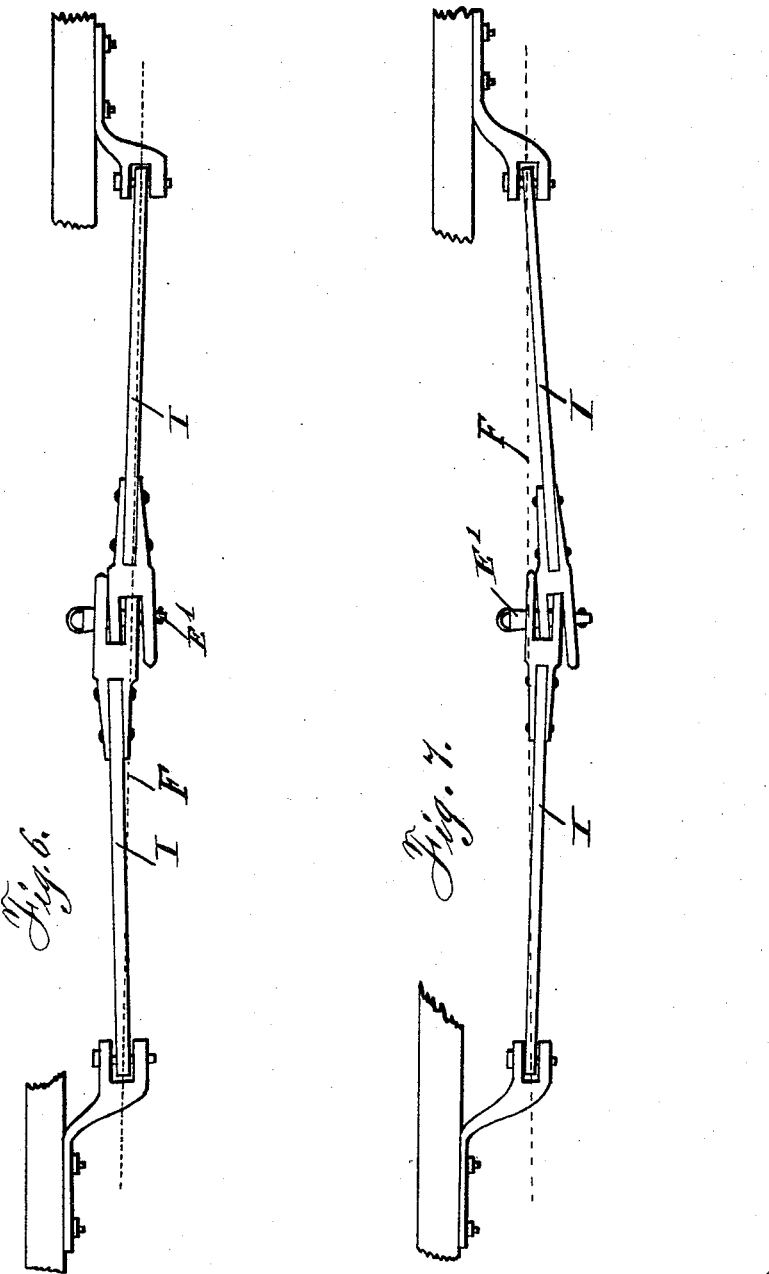

UNITED STATES PATENT OFFICE.

WILLIAM G. PRICE, OF CHICAGO, ILLINOIS.

CAR-COUPLING.

SPECIFICATION forming part of Letters Patent No. 583,548, dated June 1, 1897.

Application filed September 11, 1896. Serial No. 605,497. (No model.)

*To all whom it may concern:*

Be it known that I, WILLIAM G. PRICE, a citizen of the United States, residing at Chicago, in the county of Cook and State of Illinois, have invented certain new and useful Improvements in Car-Coupling Devices, of which the following is a specification.

My invention relates to car-couplers, and has for its object to provide a new and improved car-coupling device, of which the following is a description, reference being had to the accompanying drawings, wherein—

Figure 1 is a plan view of one form of a car-coupler embodying my invention, the parts being removed from the car. Fig. 2 is a section on line 2 2, Fig. 1. Fig. 3 is a plan view of a modified form of my device. Fig. 4 is a section on line 4 4, Fig. 3. Fig. 5 is a plan view, with parts broken away, of a second modification of my device. Fig. 6 is a view of a coupling mechanism, showing the points of suspension of the draw-bars. Fig. 7 is a view with straight draw-bars.

Like letters refer to like parts throughout the several figures.

In Figs. 1 and 2 I have shown a coupling device comprising the two draw-bars A B, connected together by the link C. These draw-bars are provided with the holes D D, by which they are connected to the car. The draw-bars are provided with the openings E, through which are inserted the pins E'. These pins are wedge-shaped, as shown, and also pass through openings in the link C. The several openings and the pins are so shaped that there is no lost motion, the draw-bars and link being rigidly connected together. If the draw-bars, link, or pin wear during use, the wedge shape of the pin allows it to move downwardly, thereby automatically adjusting the parts so as to take up the wear and thereby avoid all lost motion. The pins E' are provided at their lower ends with the lugs $E^2 E^2$. The draw-bars are provided with the downwardly-projecting pieces $E^3$, which are provided with the grooves $E^4$, into which one of the lugs $E^2$ fits when the pins are in position. These lugs on the pin prevent the pin from being forced out in case they become covered with ice or the like. If when there is a pull on the draw-bars the pins are moved upwardly, the projecting lugs $E^2$ come in contact with the link C and prevent further motion of the pins. When there is no pull on the draw-bars, the pins are easily removed.

The several parts of the coupling device are so formed that a line drawn through the center of the points of support of the draw-bars will pass below the center of the coupling, as shown in Fig. 6. This result may be obtained by making the draw-bars curved, as shown in said figure, or by bending the bars I I, which connect the draw-bars to the car-body.

In the draw-bar shown in Fig. 2 the arched effect or the downwardly-arched rigid bridge is produced by the oblique setting of the sockets of the draw-bar and by the bending of the link C. In Fig. 4 the arched effect is produced by bending the rear extremities of the draw-head downward, as shown. It is of course evident that this arched effect may be produced by other constructions than those herein shown.

When ordinary coupling devices are used, the center of the connection between the draw-bars falls below the line drawn through the points of support when there is no pull upon the draw-bars, (see Fig. 7,) owing to the fact that the parts never fit each other accurately, and hence when the cars are started so as to cause a pull upon the draw-bars the parts are moved upwardly, and hence it will be seen there is a continual vibrating movement which produces noise and shocks unpleasant to the occupants of the car.

When my construction is used, the pull on the draw-bars tends to move the center of the connection downwardly instead of upwardly, and the parts are so constructed that the center of the connection can never fall below the line F, connecting the points of support of the draw-bars. It will therefore be seen that these difficulties are obviated.

Each of the draw-bars is provided with the opening G for the ordinary pin, so that cars equipped with this coupling device can be connected to cars provided with the ordinary coupling device.

Figs. 3 and 4 show a coupling in which the link is omitted, the two draw-bars A and B being directly connected together. These two draw-bars are provided with the interlocking parts A' A' B' B', which engage each other, as shown, the pin E' passing through all of said parts, thus binding the two draw-bars together. When the coupling device is made in the form shown in Figs. 3 and 4, the parts are so constructed that the center of the coupling is above the line drawn through the points of support of the draw-bars, thereby obviating the up-and-down movement of the draw-bars heretofore referred to. The coupling shown in Figs. 3 and 4 is perfectly rigid when the pin is in position, and the pin has the same action as in Figs. 1 and 2. As shown in Fig. 5, the ends of the interlocking parts A' B' are provided with the notches H, said notches engaging projections H', located between the interlocking parts of each draw-bar. This construction prevents any side movement of the draw-bar.

As shown in Fig. 3, the construction of these parts is reversed, the parts A' B' being provided with the projection or point H², which engages a similarly-shaped opening between the arms of each draw-bar.

It will be seen that when my coupling is used the draw-bars are rigidly connected together, so that they will have practically no relative motion, and hence the shocks due to the starting and stopping of the car when ordinary coupling devices are used is avoided and as is also the rattling of the coupling devices.

The use and operation of my device will be readily seen from the foregoing description.

I have described the several parts in detail, but it is evident that the coupling devices may be varied in form, construction, and arrangement without departing from the spirit of my invention, and I therefore do not wish to be limited to the construction herein shown and described.

The objects sought to be secured by the construction shown may be further described as follows: When draw-bars in a coupling device where the bars are held rigidly together while in action to couple the cars and where these draw-bars sag down at the middle, there is a tendency when the pull is applied to straighten out the bar and thus force the pin upwardly. This is overcome by the construction which I have illustrated in Fig. 6 and described, and wherein the draw-bars, being held rigidly together, are so shaped and related to each other that they form a sort of upwardly-curved arch, and when the pull is applied their adjacent ends tend to force downwardly rather than upwardly and thus hold the pin in position rather than force it out. This shape of the draw-bar portion is also illustrated in Fig. 4, where it will be found that the adjacent ends are actually curved. I wish, however, to state this matter more particularly since any construction whereby this result is brought about is part of my present invention. In like manner this feature of my invention is illustrated in Fig. 2. The two lower members of the interlocking couplings are slotted on opposite sides of the pin, the whole being wide enough to permit the pin to pass through when the cars are to be uncoupled, but as the bars draw apart against the pin the opposed surface of the upper member will engage the lug if the pin should attempt to rise out of its position. The same construction is shown in Fig. 2, where there are two pins.

I disclaim a car-coupler comprising two draw-heads to be carried on the respective cars and each formed with a bifurcated end, said ends being adapted to intermesh, and having tapering openings through their respective parts, and the tapering coupling-pin, substantially as and for the purpose set forth.

I claim—

1. A car-coupling device comprising two draw-bars adapted to be rigidly connected and to form when connected for coupling the cars an upwardly-arched rigid bridge, and coupling device which holds the parts together, the parts all related so that when the pull is applied the tendency is to straighten such arch by pulling on it downwardly and thus tighten the coupling.

2. A coupling device for cars, comprising draw-bars attached one to each car and shaped so that when coupled, they form a rigid upwardly-arched coupling-bridge between the cars.

3. In a car-coupling device, the combination of two draw-bars, one attached to each car, and a connecting part which couples them rigidly together, the parts so constructed that when thus coupled they form an upwardly-arched rigid connection between the cars.

WILLIAM G. PRICE.

Witnesses:
 DONALD M. CARTER,
 FRANCIS M. IRELAND.